(12) United States Patent
Namiki et al.

(10) Patent No.: US 8,179,766 B2
(45) Date of Patent: May 15, 2012

(54) RECORDING DEVICE AND METHOD, AND COMPUTER PROGRAM

(75) Inventors: Tsuyoshi Namiki, Iruma (JP); Masahiro Kato, Tokorozawa (JP); Tsuyoshi Hasebe, Tokorzawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 12/745,658

(22) PCT Filed: Dec. 3, 2007

(86) PCT No.: PCT/JP2007/073353
§ 371 (c)(1),
(2), (4) Date: Oct. 27, 2010

(87) PCT Pub. No.: WO2009/072181
PCT Pub. Date: Jun. 11, 2009

(65) Prior Publication Data
US 2011/0128830 A1 Jun. 2, 2011

(51) Int. Cl.
*G11B 7/00* (2006.01)
(52) U.S. Cl. .......... 369/94; 369/30.1
(58) Field of Classification Search .......... 369/94, 369/30.04, 30.07, 30.1, 47.31, 53.2, 53.24, 369/53.31, 47.22
See application file for complete search history.

(56) References Cited

U.S. PATENT DOCUMENTS

| | | | |
|---|---|---|---|
| 7,286,153 B1 * | 10/2007 | Sugiyama et al. | 347/224 |
| 2006/0233079 A1 * | 10/2006 | Teranishi | 369/53.24 |
| 2007/0014223 A1 | 1/2007 | Brondijk | |
| 2007/0109920 A1 * | 5/2007 | Chang et al. | 369/30.04 |
| 2007/0217313 A1 * | 9/2007 | Katata et al. | 369/59.25 |
| 2008/0144455 A1 * | 6/2008 | Sasaki | 369/47.15 |
| 2008/0165666 A1 * | 7/2008 | Yeh | 369/275.1 |
| 2008/0225659 A1 * | 9/2008 | Kuroda et al. | 369/53.11 |

FOREIGN PATENT DOCUMENTS

| | | |
|---|---|---|
| JP | 2006-019019 | 1/2006 |
| JP | 2007-507824 | 3/2007 |
| JP | 2007-510251 | 4/2007 |
| WO | 2005/034118 | 4/2005 |
| WO | W02005/066953 | 7/2005 |

OTHER PUBLICATIONS

International Search Report, PCT/JP2007/073353, Jan. 8, 2008.

* cited by examiner

*Primary Examiner* — Thang Tran
(74) *Attorney, Agent, or Firm* — Young & Thompson

(57) ABSTRACT

A recording device comprises a recording means (213, 214) for recording content data on a recordable recording medium (100) having a first recording layer (110) including a first data area (112) and a second recording layer (120) including a second data area (122), a first reading means (213, 214) for reading the address of the position corresponding to the maximum capacity of the first data area, a second reading means (221) for reading the address of the layer jump position of the content data, a calculating means for calculating the position at which the recording of the contents data is started such that the layer jump position of the content data is recorded at the position corresponding to the maximum capacity of the first data area, and a first controlling means (221); for controlling the recording means such that first padding data is recorded in an area from the start position of the first data area to the position at which the recording of the contents data is started.

8 Claims, 7 Drawing Sheets

US 8,179,766 B2

RECORDING DEVICE AND METHOD, AND COMPUTER PROGRAM

TECHNICAL FIELD

The present invention relates to a recording apparatus and method, such as a DVD recorder, for recording content data delivered through a network, such as the Internet, onto a multilayer recording medium, such as a dual-layer DVD (DVD Dual Layer), and a computer program which makes a computer function as the recording apparatus.

BACKGROUND ART

Recently, development has been provided for such a delivery system that content data (title), such as a movie, is stored in a server on the Internet, that the content data is delivered to a user, and that the user records the delivered content data onto an optical disc. In particular, considering that the content data to be delivered is a movie or the like the user does not have to edit in many cases, development has been provided for such a delivery system that the content data is stored on the server in accordance with the DVD-Video standard, which adopts the CSS encryption method (i.e. that the content data is stored on the server in substantially the same condition as that it is recorded on a DVD-ROM, which is a dual-layer, read-only recording medium), before the content data is delivered. Moreover, considering that the content data that has been released recently has increased in size, it is realistic to develop a delivery system that can deliver the content data to be recorded onto the dual-layer DVD-ROM.

Therefore, in order to record the delivered content data, the user needs to provide a dual-layer, recordable recording medium (e.g. a dual-layer DVD-R) or the like. Incidentally, as for dual-layer recording, patent documents 1 and 2 disclose basic technologies.

Patent document 1: Japanese Patent Application Laid Open No. 2006-19019
Patent document 2: Japanese Patent Application Laid Open No. 2007-510251

DISCLOSURE OF INVENTION

Subject to be Solved by the Invention

However, when the content data delivered in the above manner, for example, DVD-Video is to be recorded onto the dual-layer DVD-R, the following technical problems may occur due to a difference between the standard (format) of the dual-layer, read-only DVD-ROM and the standard of the dual-layer, recordable DVD-R and due to and restrictions determined in the DVD-Video standard.

In the dual-layer DVD-ROM, the last sector address of a first recording layer (L0 layer) and the last sector address of data (i.e. the last sector address of a second recording layer (L1 layer)) are recorded in a CDZ (Control Data Zone) provided in a lead-in area. On the other hand, in the dual-layer DVD-R, a value corresponding to the maximum recording capacity of the first recording layer (End Sector number of Layer0) and a value corresponding to the maximum recording capacity of the DVD-R (Last Recordable Address) are recorded in the CDZ prewritten in the lead-in area. Moreover, in addition to the CDZ, there is provided a RPFIZ (R-Physical Format Information Zone) in which the last sector address of the data actually recorded in finalizing (Last Recorded Address) is recorded.

In the reproduction on the DVD-ROM, the last sector address is obtained from the CDZ. On the other hand, in the reproduction on the DVD-R, the last sector address is obtained from the RPFIZ. A reproducing apparatus reads an AVDP (Anchor Volume Descriptor Pointer) recorded at the obtained last sector address (i.e. Last Recorded Address) and accesses the actual data of record information recorded on the DVD-ROM or DVD-R.

However, if the data is recorded on the recordable recording medium such that it has the same format as that of the read-only recording medium, for example, the capacity of the recorded record information cannot be recorded on the recording medium because the RPFIZ cannot be provided, and the information, such as the AVDP, that is important in the reproduction on the recording medium cannot be obtained. Thus, the recordable recording medium would likely constitute a violation of the standard, which is technically problematic.

Incidentally, the "AVDP" corresponds to an entry point for searching for the management information of an UDF (Universal Disk Format). The AVDP is normally recorded in the 256-th sector and the N-th sector (wherein "N" is the maximum logical sector number) or the (N-256)-th sector, and it is information referred to when the actual data is accessed.

Moreover, if the aforementioned content data is recorded onto the dual-layer DVD-R, trying to record the content data as it is onto the DVD-R may lead to a violation of a predetermined standard due to the following technical restrictions.

Firstly, as for a position at which the recording layer is changed in the middle of the content data, it needs to be a Cell boundary, an ECC boundary, and a position at which the continuous reproduction of data is not guaranteed in Seamless Playback Flag indicating whether or not the continuous reproduction of data is guaranteed. Moreover, even if the content data is placed and recorded in the first and second recording layers in the same layout as that of the dual-layer DVD-ROM, for example, if the size of the content data recorded in the first recording layer is less than the recording capacity of the first recording layer, then, such technical problems would occur that an unrecorded area is produced from the last address of the content data recorded in the first recording layer to the last address of an area in which user data can be recorded in the first recording layer, and that the data becomes logically discontinuous at the recording-layer changing position. This will also lead to the aforementioned violation of the standard.

In view of the aforementioned problems, it is therefore an object of the present invention to provide a recording apparatus and method, and a computer program which can improve the versatility of a recording medium recorded on the recording apparatus and which can bring the recording medium into compliance with a predetermined standard.

Means for Solving the Subject

The above object of the present invention can be achieved by a recording apparatus provided with: a recording device for recording content data onto a recording medium which has a first recording layer including a first data area in which the content data is recorded by applying a laser beam and a second recording layer including a second data area in which the content data is recorded by applying the laser beam through the first recording layer and on which an address of a position corresponding to a maximum capacity of the first data area is recorded in advance; a first reading device for reading the address of the position corresponding to the maximum capacity of the first data area; an obtaining device for obtaining an address of a layer jump position when the content data is recorded onto the recording medium; a calculating device for calculating an address of a position to start the recording of the content data such that the layer jump position in the content data corresponds to the position corresponding to the maximum capacity of the first data area; and a first controlling device for controlling the recording device to record first padding data into an area from a start position of the first data area to the position to start the recording of the content data before the content data is recorded.

The above object of the present invention can be also achieved by a computer program for controlling a computer provided in a recording apparatus provided with: a recording device for recording content data onto a recording medium which has a first recording layer including a first data area in which the content data is recorded by applying a laser beam and a second recording layer including a second data area in which the content data is recorded by applying the laser beam through the first recording layer and on which an address of a position corresponding to a maximum capacity of the first data area is recorded in advance; a first reading device for reading the address of the position corresponding to the maximum capacity of the first data area; an obtaining device for obtaining an address of a layer jump position when the content data is recorded onto the recording medium; a calculating device for calculating an address of a position to start the recording of the content data such that the layer jump position in the content data corresponds to the position corresponding to the maximum capacity of the first data area; and a first controlling device for controlling the recording device to record first padding data into an area from a start position of the first data area to the position to start the recording of the content data before the content data is recorded, the computer program making the computer function as at least one portion of the recording device, the first reading device, the obtaining device, the calculating device, and the first controlling device.

The above object of the present invention can be also achieved by a recording method provided with: a recording process of recording content data onto a recording medium which has a first recording layer including a first data area in which the content data is recorded by applying a laser beam and a second recording layer including a second data area in which the content data is recorded by applying the laser beam through the first recording layer and on which an address of a position corresponding to a maximum capacity of the first data area is recorded in advance; a first reading process of reading the address of the position corresponding to the maximum capacity of the first data area; an obtaining process of obtaining an address of a layer jump position when the content data is recorded onto the recording medium; a calculating process of calculating an address of a position to start the recording of the content data such that the layer jump position in the content data corresponds to the position corresponding to the maximum capacity of the first data area; and a first controlling process of controlling the recording device to record first padding data into an area from a start position of the first data area to the position to start the recording of the content data before the content data is recorded.

Figure 1:
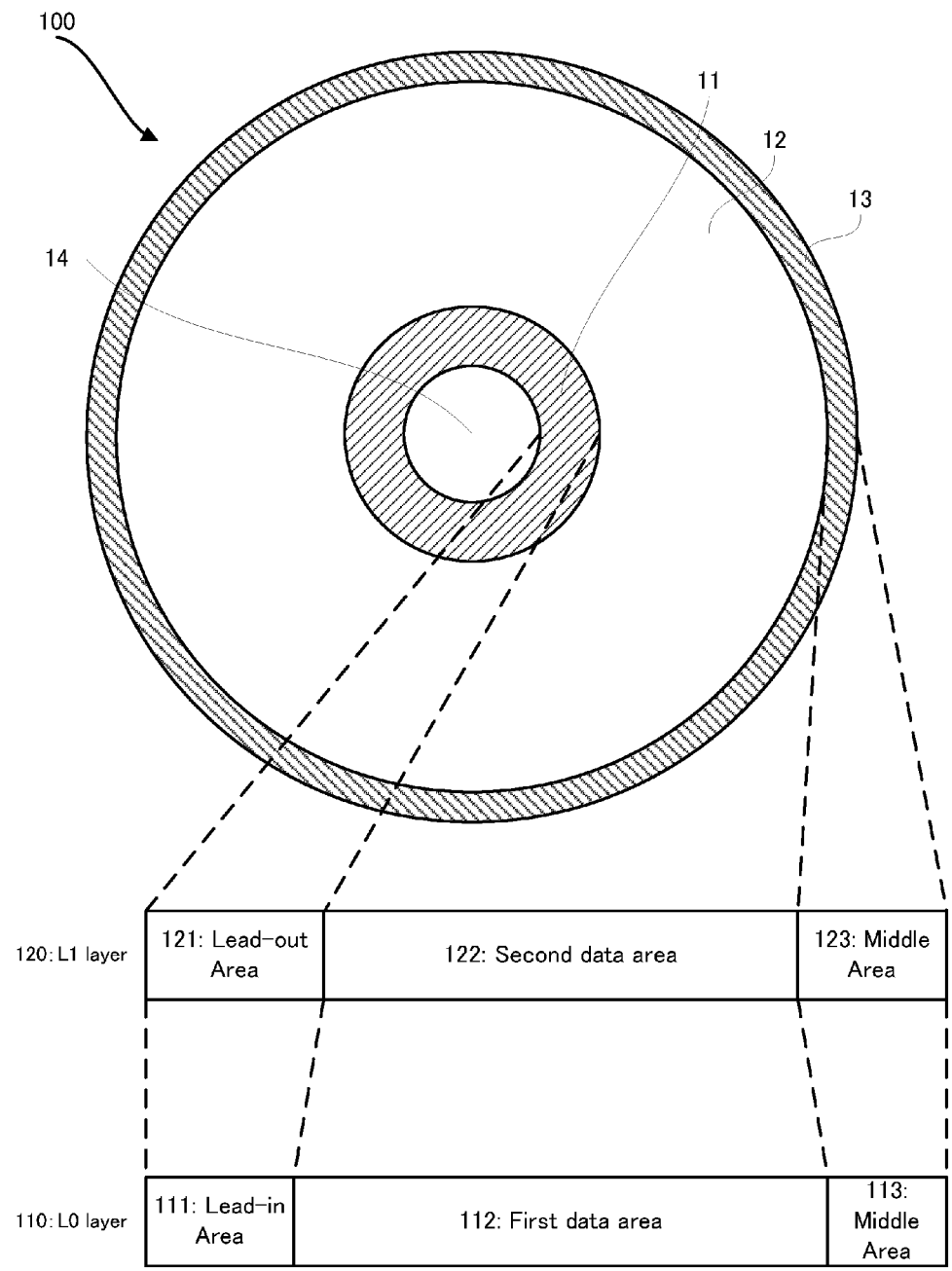
FIG. 1 is a schematic plan view showing an optical disc in an example having a plurality of areas and a schematic diagram showing an area structure in the radial direction of each recording layer.

DESCRIPTION OF REFERENCE CODES 21 drive module
22 host computer
100 optical disc
110 L0 layer
111 lead-in area
112 first data area
113, 123 middle area
120 L1 layer
121 lead-out area
122 second data area
131 CDZ
133 AVDP
211 spindle motor
212 optical pickup
213 signal recording/reproducing device
214, 221 CPU
215, 222 memory
216, 223 data input/output device

BEST MODE FOR CARRYING OUT THE INVENTION

Hereinafter, as the best mode for carrying out the present invention, an explanation will be given on embodiments of the recording apparatus and method, the computer program, and the recording medium of the present invention.

(Embodiment of Recording Apparatus)
<1>
An embodiment of the recording apparatus of the present invention is a recording apparatus provided with: a recording device for recording content data onto a recording medium which has a first recording layer including a first data area in which the content data is recorded by applying a laser beam and a second recording layer including a second data area in which the content data is recorded by applying the laser beam through the first recording layer and on which an address of a position corresponding to a maximum capacity of the first data area is recorded in advance; a first reading device for reading the address of the position corresponding to the maximum capacity of the first data area; an obtaining device for obtaining an address of a layer jump position when the content data is recorded onto the recording medium; a calculating device for calculating an address of a position to start the recording of the content data such that the layer jump position in the content data corresponds to the position corresponding to the maximum capacity of the first data area; and a first controlling device for controlling the recording device to record first padding data into an area from a start position of the first data area to the position to start the recording of the content data before the content data is recorded.

According to the embodiment of a recording apparatus of the present invention, when the content data is recorded onto the recordable recording medium provided with the first recording layer and the second recording layer (e.g. a dual-layer DVD-R), the actual layer jump position of the content data is obtained, and the position to start the recording of the content data is calculated such that the layer jump position corresponds to the position corresponding to the maximum capacity of the first data area (i.e. a position indicated by the last address of the first data area (L0 End20 Adr)), which is a user data recording area in the first recording layer. Moreover, the first padding data is compensated and recorded into the area from the start address of the first data area to the address of the position to start the recording of the content data.

Incidentally, as the recordable recording medium which is a target for the recording operation by the recording apparatus in the embodiment, for example, the dual-layer DVD-R is listed as one example. Moreover, the content data in the embodiment is typically content data in substantially the same state as that of data recorded on a dual-layer, read-only recording medium (e.g. a DVD-ROM DL). Such content data may be delivered to the recording apparatus through a network, such as a communication line and a broadcasting line, and then recorded onto the recording medium by the operation of the recording apparatus.

In the embodiment, by the operation of the first reading device, the last address of the first data area on the recording medium (i.e. the user data recording area in the first recording layer) is read. The last address is recorded in, for example, the CDZ prewritten on the recording medium, and the first reading device reads it.

Moreover, by the operation of the obtaining device, the address of the actual layer jump position of the content data is obtained. The layer jump position is a position indicating the boundary of the position of the data recorded in the first recording layer and the position of the data recorded in the second recording layer when the content data is recorded on the dual-layer recording medium, and a position at which the continuous reproduction is not guaranteed in the content data. The layer jump position is typically the Cell boundary and the boundary of an ECC block (Error Correction Code), which is a data recording unit, and a position specified by Seamless Playback Flag indicating that the continuous reproduction is guaranteed. At this time, by performing a process described later, it is possible to obtain a position that is not the ECC boundary as the layer jump position.

Moreover, the layer jump position needs to satisfy the conditions that the sum of a size from the start position of the content data to the layer jump position candidate and the size of a file system, which is information for controlling reproduction of the content data, is less than or equal to the maximum capacity of the first data area and that a size from the layer jump position candidate to the end position of the content data is less than or equal to the maximum capacity of the second data area, when the content data is divided into two at least at the layer jump position. In an aspect of the embodiment, information indicating the layer jump position may be delivered, simultaneously with the content data or with it added to the content data. In this case, the obtaining device preferably obtains the layer jump position directly from the information indicating the layer jump position. Alternatively, as detailed later, for example, the recording apparatus may calculate the layer jump position by an computing operation on the basis of the content data (or various management information or the like included in the content data), thereby obtaining the layer jump position.

Then, by the operation of the first calculating device, the recording start position of the content data in the first data area is calculated such that the layer jump position of the content data corresponds to the position indicated by the last address of the first data area on the recording medium.

After that, simultaneously with or in tandem with the recording of the content data onto the recording medium by the operation of the recording device, the first padding data is recorded into the area from the start position of the first data area to the calculated recording start position of the content data, under the control of the first controlling device.

"The padding data" in the present invention is data compensated in a case where the a data capacity is insufficient when a certain capacity of data is formed, and for example, it is all-zero data.

Here, the first controlling device may generate the first padding data when controlling the recording device and generate image data including the content data and the first padding data. Alternatively, the first controlling device may record the first padding data simultaneously with or in tandem with the content data without generating the image data. The first controlling device authorizes the content data when generating the image data. Incidentally, the content data is encrypted by a predetermined method, such as CSS (Content Scramble System). Moreover, the format structure of the image data in the present invention is the same as that of the read-only recording medium.

Alternatively, position information indicating the area from the start position when the first padding data is recorded (i.e. the start address of the first data area) to the end position (i.e. the start address of the content data recorded), or the recording start position of the first padding data and the size of the first padding data may be determined without the first padding data generated.

If the first controlling device generates the padding data, the capacity of such an area is calculated that is obtained by subtracting an area in which predetermined data, such as the file system, is recorded from an area between the start position to the end position when the first padding data is recorded. Then, the first controlling device prepares the first padding data having a size corresponding to the capacity of the calculated area, or it prepares low-capacity padding data having a lower capacity than the size of the first padding data calculated.

Incidentally, the capacity of the low-capacity padding data is typically less than or equal to the capacity of the data that can be transmitted at a time between a host computer and a drive module in the recording apparatus.

The recording device in the drive module records the generated image data onto the recording medium. Incidentally, when the image data is recorded, typically, the generated image data is divided into a plurality of data having a data size (e.g. 2ECC blocks) that can be transmitted at a time from the host computer to the drive module. Then, the recording device repeats the reception of the divided data and the recording of the received data onto the recording medium.

If the first controlling device prepares the low-capacity padding data and when the recording device records the data into the area in which the first padding data is to be recorded on the recording medium, the host computer repeatedly transmits the generated low-capacity padding data to the drive module until the size of the first padding data is reached.

Moreover, if the first controlling device does not prepare the low-capacity padding data and when the recording device records the data into the area in which the first padding data is to be recorded on the recording medium, the host computer transmits, for example, a command or the like for the recording device to prepare and record the padding data, to the drive module. The recording device prepares the padding data in accordance with the transmitted command or the like and records the prepared first padding data onto the recording medium. Incidentally, the transmitted command or the like includes information indicating the size and the address to start the recording of the first padding data.

Moreover, as described above, if the position that is not the ECC boundary is obtained as the layer jump position, then, a sector unit of dummy data is recorded immediately after the file system to make the end of the data in the L0 layer into the ECC boundary.

As explained above, according to the recording apparatus in the embodiment, it is possible to record the content data in substantially the same state as that of the data recorded on the dual-layer, read-only recording medium, with the padding data compensated in the first data area, such that the layer jump position of the content data corresponds to the position indicated by the last address of the first data area. By this, for example, even if the size of the content data recorded in the first data area falls below the recording capacity of the first data area, the recording is controlled such that the layer jump position is brought to the last address of the first data area, so that it is possible to record the content data, which is logically continuous, without any unrecorded area left at the position at which the recording layer is changed, and it is also possible to bring it in compliance with the predetermined standard.

<2>

In one aspect of the recording apparatus of the present invention, an address of a position corresponding to a maximum capacity of the second data area is recorded in advance on the recording medium, and the recording apparatus is further provided with: a second reading device for reading the address of the position corresponding to the maximum capacity of the second data area; and a second controlling device for controlling the recording device to record second padding data into an area from a position corresponding to a maximum capacity of the content data to be recorded in the second data area to the position corresponding to the maximum capacity of the second data area.

According to this aspect, simultaneously with or in tandem with the recording of the content data, the second padding data is recorded such that the entire area from the last address of the content data recorded in the second data area to the position corresponding to the maximum capacity of the second data area (i.e. the last address (Last Adr)) has been recorded.

Incidentally, in the rear of the area in which the second padding data is recorded, i.e. at the position equating to the last address of the second data area on the recording medium, the predetermined data, such as the AVDP, is disposed.

Here, the second controlling device may prepare the second padding data and generate image data including the content data and the second padding data, as in the control operation of the first controlling device described above. Alternatively, the second controlling data may record the second padding data simultaneously with or in tandem with the content data without generating the image data.

Alternatively, position information indicating the area from the start position when the second padding data is recorded (i.e. the last address of the content data recorded) to the end position (i.e. the last address of the second data area), or the recording start position of the second padding data and the size of the second padding data may be determined without the second padding data generated.

If the second controlling device prepares the padding data, the capacity of an area obtained by subtracting an area in which the predetermined data, such as the AVDP, is recorded from an area between the start position to the end position when the second padding data is recorded is calculated. Then, the second controlling device prepares the second padding data having a size corresponding to the capacity of the calculated area, or it prepares low-capacity padding data having a lower capacity than the size of the second padding data calculated. Then, the recording device repeats the reception of the divided data and the recording of the received data onto the recording medium.

If the second controlling device prepares the low-capacity padding data and when the recording device records the data into the area in which the second padding data is to be recorded on the recording medium, the host computer repeatedly transmits the generated low-capacity padding data to the drive module until the size of the second padding data is reached.

Moreover, if the second controlling device does not prepare the low-capacity padding data and when the recording device records the data into the area in which the second padding data is to be recorded on the recording medium, the host computer transmits, for example, a command or the like for the recording device to prepare and record the padding data, to the drive module. The recording device prepares the padding data in accordance with the transmitted command or the like and records the prepared second padding data onto the recording medium. Incidentally, the transmitted command or the like includes information indicating the size and the address to start the recording of the second padding data.

In general, in the CDZ in the lead-in area of a DVD-ROM as one example of the read-only recording medium, the last address of data, such as the content data recorded in the DVD-ROM, is recorded. When the DVD-ROM is reproduced, a reproducing apparatus firstly obtains the AVDP in accordance with the last address recorded in the CDZ.

On the other hand, in the CDZ in the lead-in area of a DVD-R as one example of the recordable recording medium, the maximum capacity of the DVD-R (in other words, the address of the position corresponding to the maximum capacity) is recorded, and the actual last address of the data recorded in the DVD-R (i.e. the address of an end portion of the actually recorded data) is recorded in the RPFIZ. When the DVD-R is reproduced, the reproducing apparatus firstly obtains the AVDP in accordance with the last address recorded in the RPFIZ.

If the format structure of the DVD-R is set to the same format structure of the DVD-ROM (e.g. if the RPFIZ is not provided), the reproducing apparatus attempts to obtain the AVDP in accordance with the maximum capacity of the DVD-R recorded in the CDZ. However, since there are various capacities of the data actually recorded on the DVD-R, the reproducing apparatus possibly cannot obtain the AVDP disposed at the end of the recorded data. Alternatively, it is found that when verification is performed on the DVD-R, the AVDP possibly cannot be detected and it would likely constitute a violation of the standard.

According to the embodiment of the recording apparatus of the present invention, however, in the recording apparatus for recording the content data onto the dual-layer, recordable recording medium in which the content data has the same format structure as that of the read-only recording medium, which is downloaded through the network or the like and in which the RPFIZ is not provided, it is possible to record the predetermined data, such as the AVDP, disposed at the sector address indicating the end of the data area, at the position corresponding to the maximum capacity of the second data area, i.e. at the end position in the data area on the recording medium. Thus, the size of the data, such as the content data, recorded on the recording medium is equal to the maximum capacity.

By virtue of such construction, even if the content data having the same format structure as that of the read-only recording medium is recorded onto the dual-layer, recordable recording medium, the reproducing apparatus can obtain, for example, the AVDP in accordance with the address of the position corresponding to the maximum capacity recorded on the recording medium.

As a result, according to the embodiment of the recording apparatus of the present invention, it is possible to improve the versatility of the recorded recording medium and bring it into compliance with the predetermined standard.

<3>

In another aspect of the recording apparatus of the present invention, the obtaining device is provided with: a first determining device for determining an address of at least one layer jump position candidate in which continuous reproduction is not guaranteed, in the content data; and a second determining device for determining the layer jump position candidate (i) that a sum of a size from the start position of the content data to the layer jump position candidate and a size of a file system, which is information for controlling reproduction of the content data, is less than or equal to the maximum capacity of the first data area and (ii) that a size from the layer jump position candidate to an end position of the content data is less than or equal to a maximum capacity of the second data area, to be the layer jump position.

According to this aspect, if the layer jump position cannot be directly obtained for the reason that the address of the layer jump position in the content data is not added or that it is not simultaneously delivered, or the like, then, one or a plurality of layer jump position candidates are determined from additional various information (e.g. VMGI, VTSI, or the like described later) included in the content data, and if the layer jump position candidates satisfy predetermined conditions, then, they can be determined to be the layer jump position. From this, even if the address of the layer jump position is not specified, the layer jump position can be set by the operation of the recording apparatus in the embodiment.

Here, the predetermined conditions are that the sum of the size from the start position of the content data to the layer jump position and the size of the file system is less than or equal to the maximum capacity of the first data area and that the size from the layer jump position candidate to the end position of the content data is less than or equal to the maximum capacity of the second data area, when the content data is divided into two in the layer jump position candidate.

Specifically, the additional various information included in the content data may be, for example, information indicating the layer jump position candidate described later, or information required for the recording apparatus to determine the layer jump position candidate. In other words, in order to record the content data for the dual-layer DVD-ROM onto the dual-layer DVD-R having a different area structure, information for appropriately dividing the content data to have a size recordable in each of the first data area and the second data area is included in a range of "the additional various information" in the embodiment.

Moreover, as the information required for the recording apparatus to determine the layer jump position candidate, for example, an IFO file is listed as one example, such as VMGI (Video Manager Information) and VTSI (Video Title Set Information). More specifically, when "the continuous reproduction is not guaranteed", for example, such a position that is the Cell boundary which is the reproduction unit of the content data and the boundary of the ECC (Error Correction Code) block which is the data recording unit and that is not specified by Seamless Playback Flag indicating that the continuous reproduction is guaranteed is detected as a dividing point candidate position in the IFO file. The detection of the dividing point candidate position is performed by the operation of the dividing device. At this time, as described above, by performing, at the time of the recording process, a process of recording a sector unit of dummy data immediately after the file system and making an adjustment to make the end of the data in the L0 layer into the ECC boundary, the position that is not the ECC boundary can be added to the layer jump position candidate.

<4>

In another aspect of the recording apparatus of the present invention, the recording device records management information, which is information for managing the content data to be recorded, at a position corresponding to the maximum capacity of the second data area on the recording medium.

According to this aspect, the recording device records the management information, which is information for managing the content data to be recorded, such as the AVDP, at the position corresponding to the value of a medium capacity indicated by read capacity information on the recording medium.

<5>

In another aspect of the recording apparatus of the present invention, the first controlling device is provided with a first computing device for computing a size of the first padding data from an address of the start position of the first data area and the address of the position to start the recording of the content data, and the second controlling device is provided with a second computing device for computing a size of the second padding data from an address of the position corresponding to the maximum capacity of the content data to be recorded and the address of the position corresponding to the maximum capacity of the second data area.

According to this aspect, the computing devices calculate the sizes of the first and second padding data from the start address of the first data area and the last address of the second data area which are read and from the address indicating the recording start position of the content data and the last address of the content data recorded which are calculated, respectively. This makes it possible to calculate the size of the padding data, relatively easily.

<6>

In an aspect associated with the computing devices, the recording apparatus may be further provided with a preparing device for preparing the first padding data having the size computed by the first computing device under the control of the first controlling device and preparing the second padding data having the size computed by the second computing device under the control of the second controlling device.

By virtue of such construction, the padding data corresponding to each size calculated by the computing device is generated.

(Embodiment of Computer Program)

<7>

An embodiment of the computer program of the present invention is a computer program for controlling a computer provided in a recording apparatus provided with: a recording device for recording content data onto a recording medium which has a first recording layer including a first data area in which the content data is recorded by applying a laser beam and a second recording layer including a second data area in which the content data is recorded by applying the laser beam through the first recording layer and on which an address of a position corresponding to a maximum capacity of the first data area is recorded in advance; a first reading device for reading the address of the position corresponding to the maximum capacity of the first data area; an obtaining device for obtaining an address of a layer jump position when the content data is recorded onto the recording medium; a calculating device for calculating an address of a position to start the recording of the content data such that the layer jump position in the content data corresponds to the position corresponding to the maximum capacity of the first data area; and a first controlling device for controlling the recording device to record first padding data into an area from a start position of the first data area to the position to start the recording of the content data before the content data is recorded, the computer program making the computer function as at least one portion of the recording device, the first reading device, the obtaining device, the calculating device, and the first controlling device.

According to the embodiment of the computer program of the present invention, the aforementioned embodiment of the recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects in the embodiment of the recording apparatus of the present invention described above, the embodiment of the computer program of the present invention can also adopt various aspects.

(Embodiment of Computer Program Product)

An embodiment of the computer program product of the present invention is a computer program product in a computer-readable medium for tangibly embodying a program of instructions executable by a computer provided in a recording apparatus provided with: a recording device for recording content data onto a recording medium which has a first recording layer including a first data area in which the content data is recorded by applying a laser beam and a second recording layer including a second data area in which the content data is recorded by applying the laser beam through the first recording layer and on which an address of a position corresponding to a maximum capacity of the first data area is recorded in advance; a first reading device for reading the address of the position corresponding to the maximum capacity of the first data area; an obtaining device for obtaining an address of a layer jump position when the content data is recorded onto the recording medium; a calculating device for calculating an address of a position to start the recording of the content data such that the layer jump position in the content data corresponds to the position corresponding to the maximum capacity of the first data area; and a first controlling device for controlling the recording device to record first padding data into an area from a start position of the first data area to the position to start the recording of the content data before the content data is recorded, the computer program product making the computer function as at least one portion of the recording device, the first reading device, the obtaining device, the calculating device, and the first controlling device.

According to the embodiment of the computer program product of the present invention, the aforementioned embodiment of the recording apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned embodiment of the recording apparatus of the present invention.

Incidentally, in response to the various aspects in the embodiment of the recording apparatus of the present invention, the embodiment of the computer program product of the present invention can also employ various aspects.

(Embodiment of Recording Method)

<8>

An embodiment of the recording apparatus of the present invention is a recording method provided with: a recording process of recording content data onto a recording medium which has a first recording layer including a first data area in which the content data is recorded by applying a laser beam and a second recording layer including a second data area in which the content data is recorded by applying the laser beam through the first recording layer and on which an address of a position corresponding to a maximum capacity of the first data area is recorded in advance; a first reading process of reading the address of the position corresponding to the maximum capacity of the first data area; an obtaining process of obtaining an address of a layer jump position when the content data is recorded onto the recording medium; a calculating process of calculating an address of a position to start the recording of the content data such that the layer jump position in the content data corresponds to the position corresponding to the maximum capacity of the first data area; and a first controlling process of controlling the recording device to record first padding data into an area from a start position of the first data area to the position to start the recording of the content data before the content data is recorded.

According to the recording method of the present invention, it is possible to improve the versatility of the recorded recording medium and bring it into compliance with the predetermined standard, as in the recording apparatus of the present invention described above.

Incidentally, even the recording method of the present invention can also adopt the same various aspects as those of the recording apparatus of the present invention described above.

As explained above, according to the embodiment of the recording apparatus of the present invention, it is provided with the recording device, the first reading device, the obtaining device, the calculating device, and the controlling device. According to the embodiment of the recording method of the present invention, it is provided with the recording process, the first reading process, the obtaining process, the calculating process, and the controlling process. According to the embodiment of the computer program of the present invention, it makes a computer function as the embodiment of the recording apparatus of the present invention. Therefore, it is possible to improve the versatility of the recorded recording medium in the recording apparatus and bring it into compliance with the predetermined standard.

EXAMPLE

Hereinafter, an example of the recording apparatus of the present invention will be explained with reference to the drawings.

(1) Basic Structure of Optical Disc

Figure 2:
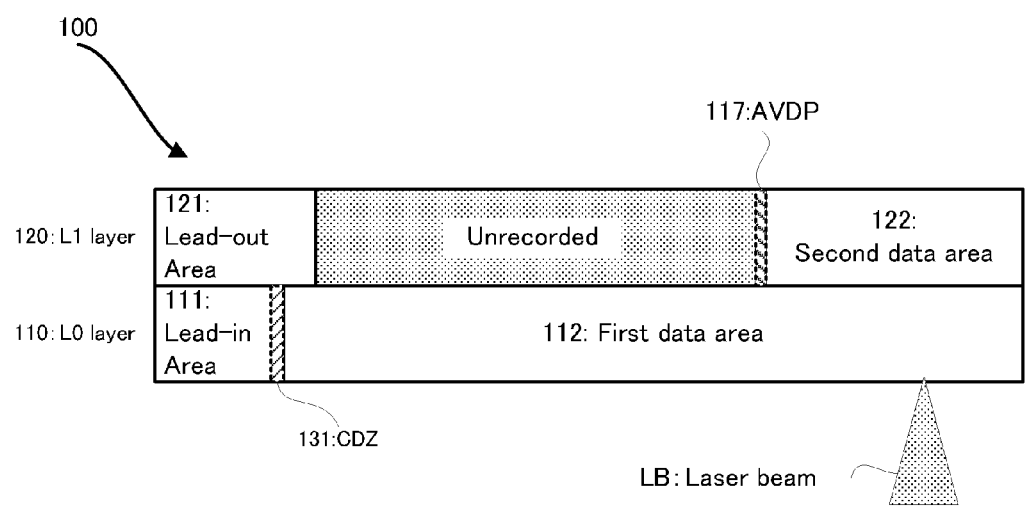
FIG. 2 is a schematic diagram showing an area structure in the radial direction of each recording layer of the optical disc in the example.

Firstly, with reference to FIG. 1 and FIG. 2, an explanation will be given on the basic structure of an optical disc as an example of the recording medium of the present invention. FIG. 1 is a schematic plan view showing an optical disc 100 in an example and a schematic conceptual view showing a recording area structure in the radial direction associated with the schematic plan view. FIG. 2 is a schematic conceptual view showing an area structure in the radial direction of the optical disc 100 in the example.

As shown in FIG. 1, the optical disc 100 is provided with a center hole 14 as the center, a lead-in area 111, a lead-out area 121, a first/second data area 112/122, and a middle area 113/123, on a recording surface on a disc main body with a diameter of approximately 12 cm as in a DVD. On the recording surface, arbitrary data can be recorded once or a plurality of times. In other words, the optical disc 100 in the example is a recordable optical disc (more specifically, a write-once optical disc including a DVD-R and a BD-R as a specific example, or a rewritable optical disc including a DVD-RW and a BD-RE as a specific example). Moreover, in the optical disc 100, a recording layer or the like is laminated on a transparent substrate not illustrated. In each recording area of the recording layer, tracks such as a groove track and a land track are alternately disposed spirally or concentrically, centered on the center hole 14. Moreover, on the track, data is divided and recorded by a unit of ECC block. The ECC Block is a data management unit in which record information is error-correctable.

In particular, the optical disc 1 in the example has such a structure that a L0 layer 110 and a L1 layer 120, which constitute one example of the first and second recording layers in the present invention, are laminated on a transparent substrate not illustrated, as shown in FIG. 2. In the recording/reproduction of the dual-layer optical disc 100, the data recording/reproduction is performed in the L0 layer 110 or in the L1 layer 120, depending on which recording layer has the focus position of a laser beam LB irradiated from the lower side to the upper side in FIG. 2. In particular, the data is recorded from the inner circumferential side to the outer circumferential side in the L0 layer 110, whereas the data is recorded from the outer circumferential side to the inner circumferential side in the L1 layer 120. In other words, the optical disc 100 in the example corresponds to an opposite track path optical disc. However, even a parallel track path optical disc can receive various benefits described hereinafter by adopting a structure explained hereinafter.

Particularly in the recording area in which normal data is recorded, such as the first/second data area 112/122, of the optical disc 100, the data is recorded into the data area 112 in the L0 layer 110 and then the data is recorded into the data area 122 in the L1 layer 120, as a general rule. That is, by irradiating the laser beam LB through the data area 112 in the L0 layer 110 in which the data is recorded, the data is recorded into the data area 122 in the L1 layer. The same is basically true for another recording area.

In the lead-in area 111 in the L0 layer 110, a CDZ 131 is disposed, wherein an address value corresponding to the maximum recording capacity of the L0 layer 110 (i.e. the last sector address of the first data area 112: End Sector number of Layer 0) and an address value corresponding to the maximum recording capacity of the optical disc 100 (in other words, the maximum recording capacity of the L1 layer 120) (i.e. the last sector address of the second data area 122: Last Recordable Address) are recorded in the CDZ 131. Incidentally, in the lead-in area 111, a disc key not illustrated is also recorded. Moreover, after content data is recorded into the second data area 122 in the L0 layer 120, an AVDP, which is management information about the optical disc 100, is disposed at the end position of the content data recorded.

(2) Basic Structure of Recording/Reproducing Apparatus

Figure 3:
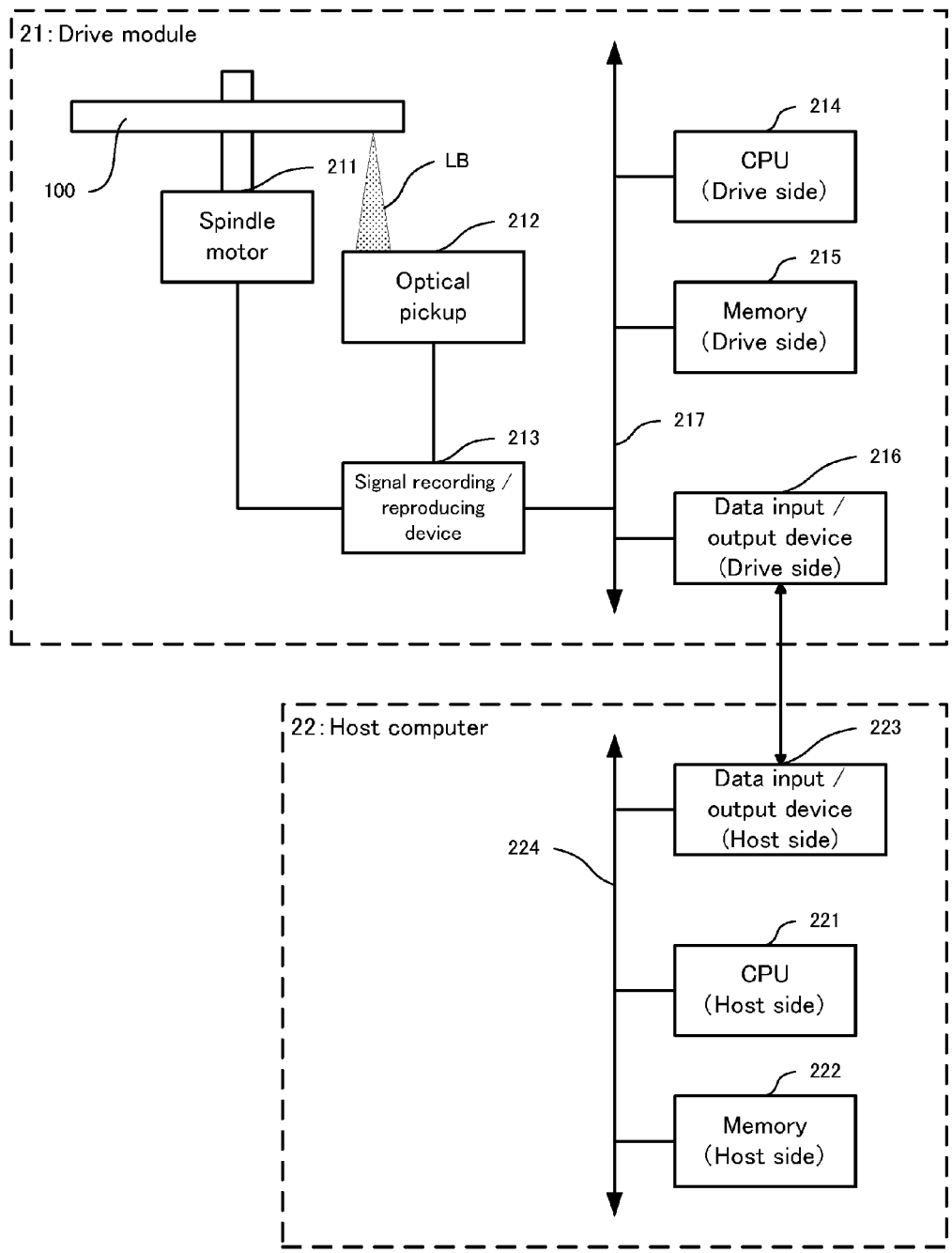
FIG. 3 is a schematic block diagram showing the basic structure of a recording apparatus in the example.

Next, with reference to FIG. 3, the structure of a recording apparatus in the example will be explained. FIG. 3 is a schematic block diagram showing the basic structure of the recording apparatus in the example.

The recording apparatus in the example in FIG. 3, such as a personal computer having a DVD drive or a kiosk terminal for recording data onto a DVD-R and selling it, is provided with a drive module 21 and a host computer 22.

The drive module 21 is provided with a spindle motor 211, an optical pickup 212, a signal recording/reproducing device 213, a CPU (Central Processing Unit) 214, a memory 215, and a data input/output device 216.

The spindle motor 211 is intended to rotate and stop the optical disc 100 and operates in accessing the optical disc 100. More specifically, the spindle motor 211 is constructed to rotate the optical disc 100 at a predetermined speed and stop it under the spindle servo provided by a not-illustrated servo unit or the like.

The signal recording/reproducing device 213 and the CPU 214 are one specific example of "the recording device", "the first reading device", and "the second reading device". The signal recording/reproducing device 213 and the CPU 214 perform the recording/reproduction on the optical disc 100 and are provided with a laser apparatus and the optical pickup 212. More specifically, the optical pickup 212 irradiates the optical disc 100 with a light beam, such as the laser beam LB, as reading light with a first power upon reproduction, and as writing light with a second power with it modulated upon recording.

The signal recording/reproducing device 213 controls the spindle motor 211 and the optical pickup 212 to perform the recording on the optical disc 100. Moreover, the signal recording/reproducing device 213 may be also contrasted such that it can reproduce the data recorded on the optical disc 100.

The host computer 22 is provided with a CPU 221, a memory 222, and a data input/output control device 223. The "CPU 221" in the example is one specific example of "the calculating device", "the first controlling device", "the second controlling device", "the first determining device", "the second determining device", "the obtaining device", "the second reading device", and "the preparing device". The CPU 221 is connected to the memory 222 and the data input/output control device 223 via the bus 357, and controls the entire recording apparatus by giving instructions to each of the constituents. In general, software for operating the CPU 221 is stored in the memory 222.

The memory 222 is used in the general data processing on the recording apparatus in the example, including a buffer area for the record/reproduction data, an area used as an intermediate buffer when data is converted into the data that can be used on the drive module 21, and the like. Moreover, the memory 222 is provided with: a Read Only Memory (ROM) area into which a program for performing an operation as a recording device is stored; a buffer used for the compression/decompression of video data; a Random Access Memory (RAM) area into which a parameter required for the operation of the program or the like is stored; and the like.

(3) First Operation Example

Figure 4:
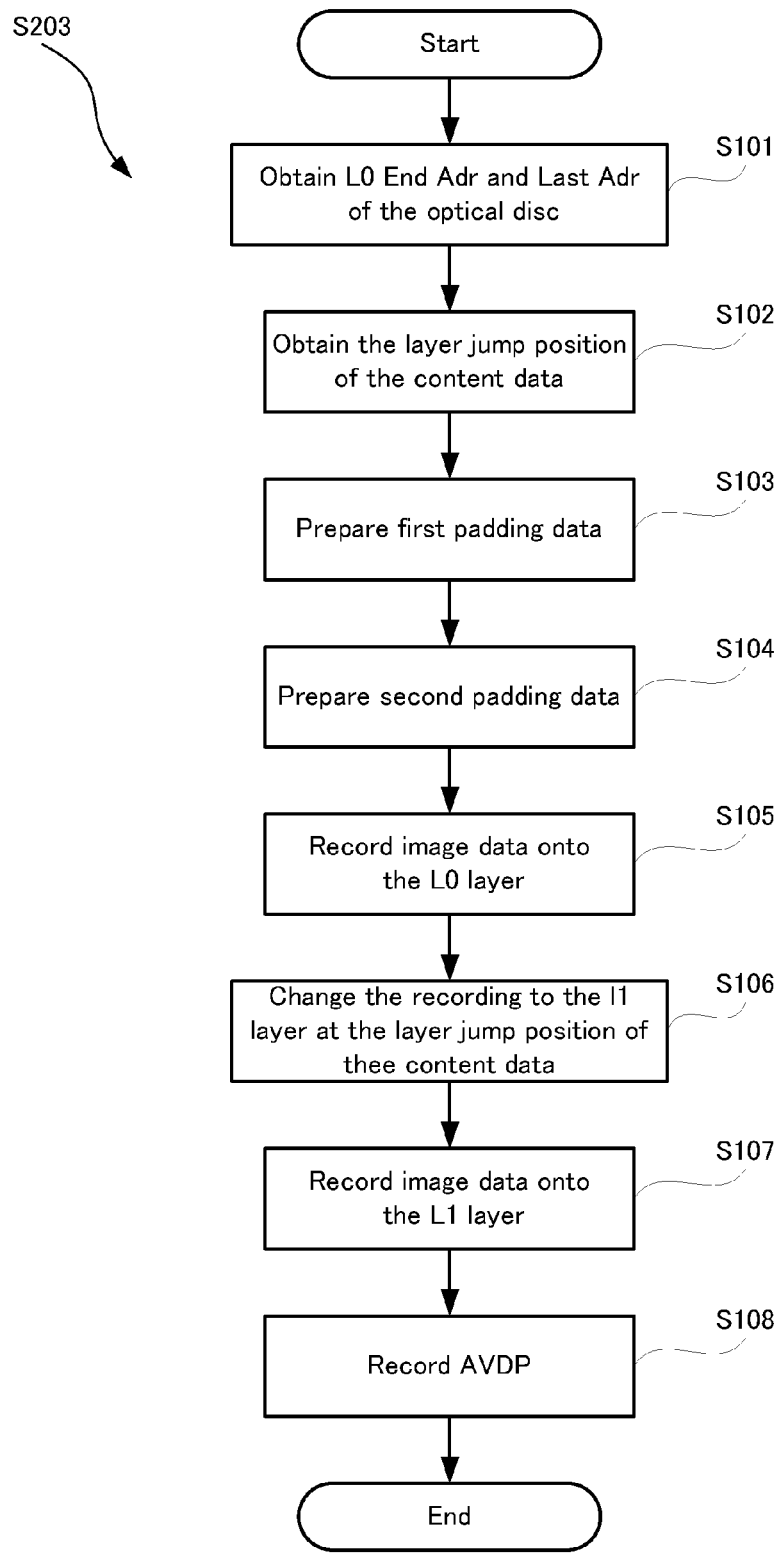
FIG. 4 is a flowchart showing a flow of operations in a recording process in a first operation example.

With reference to FIG. 4, an explanation will be given on an aspect of a recording process of recording data onto the dual-layer optical disc 100 by a first operation example of the recording apparatus in the example. FIG. 4 is a flowchart conceptually showing a flow of the recording process in the first operation example.

When the optical disc 100 is loaded on the spindle motor 211, a seek operation is performed by the optical pickup 212 under the control of the control device 214, and various management data required for the recording process performed on the optical disc 100 is obtained (step S101). The management data is, for example, the address of a position corresponding to the maximum recording capacity of the first data area 112 recorded in the CDZ 131 (hereinafter referred to as L0 End Adr, as occasion demands) and the address of a position corresponding to the maximum recording capacity of the second data area 122 (hereinafter referred to as Last Adr, as occasion demands). The management data is read by the operation of the signal recording/reproducing device 213 under the control of the CPU 214 and is sent to the CPU 221 through the data input/output devices 216 and 223.

Then, the layer jump position of the content data is obtained (step S102). Specifically, by the operation of the CPU 221, information indicating the layer jump position, added to the content data or delivered simultaneously with the content data, is read and obtained.

Then, first padding data to be recorded into the first data area 112 is prepared (step S103). Specifically, by the control of the CPU 221, the recording start position of the content data is determined such that the layer jump position corresponds to position indicated by L0 End Adr in the first data area 112, the size of an area from the position indicated by the start address of the first data area 112 to the recording start position of the content data is calculated, and the first padding data corresponding to a size obtained by subtracting a predetermined data size of a file system or the like from the calculated size is prepared. Here, the first padding data prepared by the control of the CPU 221 may be low-capacity padding data having a lower capacity than the calculated size of the first padding data. Incidentally, the capacity of the low-capacity padding data is typically less than or equal to the capacity of data which can be transmitted at a time between the host computer 22 and the drive module 21. At this time, the host computer 22 repeatedly transmits the generated low-capacity padding data to the drive module 21 through the data input/output devices 223 and 216 until the size of the first padding data is reached.

Alternatively, the CPU 221 may obtain information indicating an area from the recording start position to the recording end position of the first padding data, or a size corresponding to the area, and the recording start position without preparing the first padding data. Along with the information, the CPU 221 may transmit a command or the like to prepare and record the first padding data in the data recording described later.

Simultaneously with or in tandem with the preparation of the first padding data, second padding data to be recorded into the second data area 122 is prepared (step S104). Specifically, by the control of the CPU 221, the size of an area from the recording end position of the content data after the determination of the recording position of the content data to the position indicated by Last Adr in the second content area 112 is calculated such that the layer jump position corresponds to the position indicated by L0 End Adr in the first data area, and the second padding data corresponding to a size obtained by subtracting a predetermined data size of the AVDP or the like from the calculated size is prepared. Here, the details of the preparation of the second padding data corresponding to the calculated size are the same as those of the preparation of the first padding data (the step S103).

Then, the writing of the data onto the optical disc 100 is started (step S105 to step S107). By the control of the CPU 221, the content data, the first padding data, and the second padding data are transmitted to the signal recording/reproducing device 213 through the data input/output devices 223 and 216. Each of the data is written into the calculated recording area in the optical disc 100 or an area corresponding to the size calculated from the determined recording start position, by the operation of the optical pickup 212 under the control of the signal recording/reproducing device 213.

Here, by the control of the CPU 221, image data obtained by disposing each of the data in respective one of the recording areas may be generated, and the image data may be transmitted and recorded. Alternatively, each of the data may be transmitted and recorded.

Moreover, without the first and second padding data being prepared under the control of the CPU 221, a command or the like to prepare and record the first and second padding data may be transmitted along with information indicating an area from the recording start position and the recording end position of each padding data, or a size corresponding to the area, and the recording start position. In this case, the CPU 214 and the signal recording/reproducing device 213 in the drive module 121 prepare the first and second padding data in accordance with the transmitted command or the like and record the prepared first padding data onto the optical disc 100.

In the data writing, in the example of the present invention, after the data is recorded into the first data area 112 in the L0 layer 110 (the step S105), the layer jump is performed at the position indicated by L0 End Adr for the optical disc 100 and at the layer jump position for the content data (the step S106), and then, the data is recorded into the second data area 122 in the L1 layer 120 (the step S107), as a general rule. In other words, by applying the laser beam LB through the first data area 112 in the L0 layer 110 in which the data is recorded, the data is recorded into the data area 122 in the L1 layer 120. The same is in principle true for another recording area.

Simultaneously with or in tandem with the aforementioned data writing, the CPU 221 prepares the AVDP, which is important information in the reproduction. In the generation of the image data described above, the AVDP is disposed at a position equating to an last address at which the second padding data is recorded (i.e. the position corresponding to Last Adr in the second data area 122). Alternatively, if the image data is not generated, the prepared AVDP is transmitted to the signal recording/reproducing device 213 through the data input/output devices 223 and 216 under the control of the CPU 221 and is recorded at the position equating to the Last Adr by the operation of the optical pickup 212 (step S108).

Figure 5:
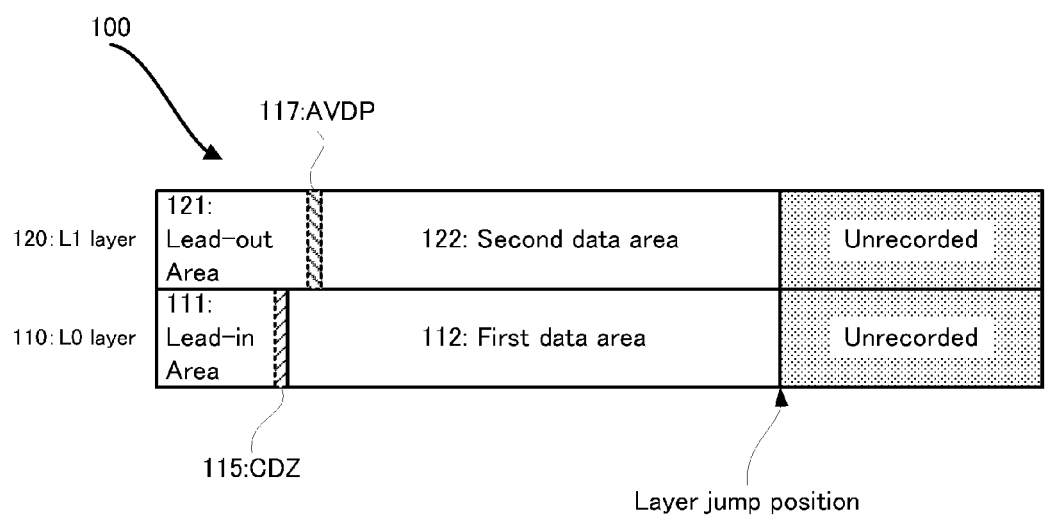
FIG. 5 is a data structure diagram conceptually showing a data structure if padding data is not compensated on the optical disc in the first operation example.
Figure 6:
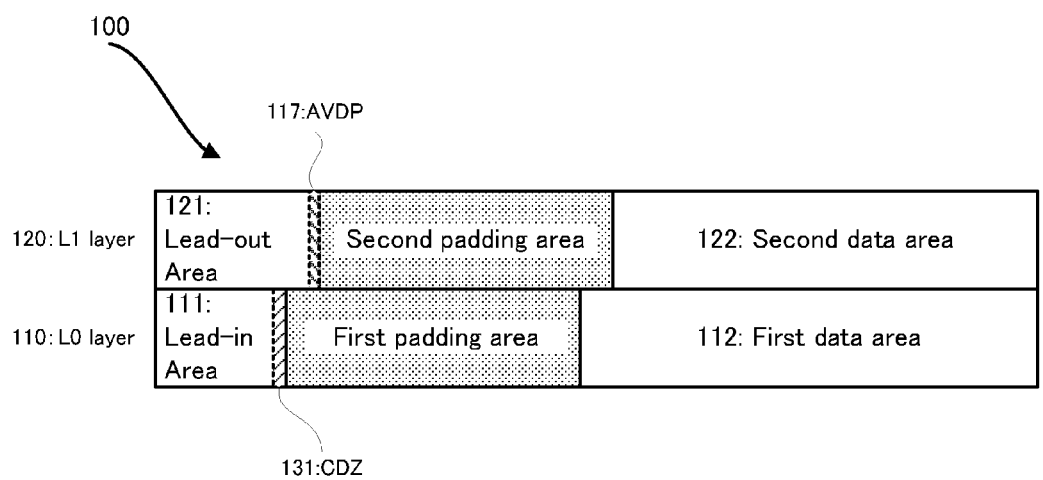
FIG. 6 is a data structure diagram conceptually showing a data structure of the optical disc in the first operation example.

With reference to FIG. 5 and FIG. 6, an explanation will be given on the data structure of the optical disc on which the data is recorded by the operation of the data recording process in the first operation example of the recording apparatus in the example. FIG. 5 is a data structure diagram conceptually showing a data structure if the padding data is not compensated on the optical disc 100. FIG. 6 is a data structure diagram conceptually showing a data structure if the padding data is compensated on the optical disc 100 in the first operation example.

In the first operation example, if the size of the content data falls below the maximum capacity of the optical disc 100, the preparation of the first and second padding data (the step S103 and the step S104) is not performed. For example, when a conventional recording process is performed, as shown in the data structure of the optical disc 100 shown in FIG. 5, the layer jump is performed at a position before L0 End Adr in the first data area 112, and an area from the position at which the layer jump is performed to the position indicated by L0 End Adr becomes an unrecorded area. Moreover, since the layer jump allows the writing of the content data onto the L1 layer 120 from the position indicated by the address of the second data area 122 corresponding to the address of the layer jump position in the first data area 112, an area from the start address of the second data area 122 to the address of the second data area 122 corresponding to the address of the layer jump position becomes an unrecorded area. This makes the data logically discontinuous at the boundary of the content data recorded in the L0 layer 110 and the content data recorded in the L1 layer 120, resulting in the preparation of the optical disc 100 which constitutes a violation of the standard and which cannot be appropriately reproduced.

On the other hand, according to the first operation example of the recording apparatus in the example, as shown in FIG. 6, the layer jump position of the content data is controlled by the CPU 221 such that it is recorded at the position indicated by L0 End Adr, and the first padding data having the same size as that of the aforementioned unrecorded area in the L0 layer 110 is recorded into an area from the start position of the first data area to the start position of the content data recorded. The second padding data having the same size as that of the aforementioned unrecorded area in the L1 layer 120 is recorded into an area from the end position of the content data recorded to the position indicated by Last Adr. This makes the boundary of the content data recorded in the L0 layer 110 and the content data recorded in the L1 layer 120 continuous through the layer jump position. Moreover, the layer jump position, as described above, is the position at which the continuous reproduction of the data is not guaranteed, so that there is no trouble in the reproduction with the layer jump, and it is possible to prepare the optical disc 100 according to a predetermined standard.

(4) Second Operation Example

Figure 7:
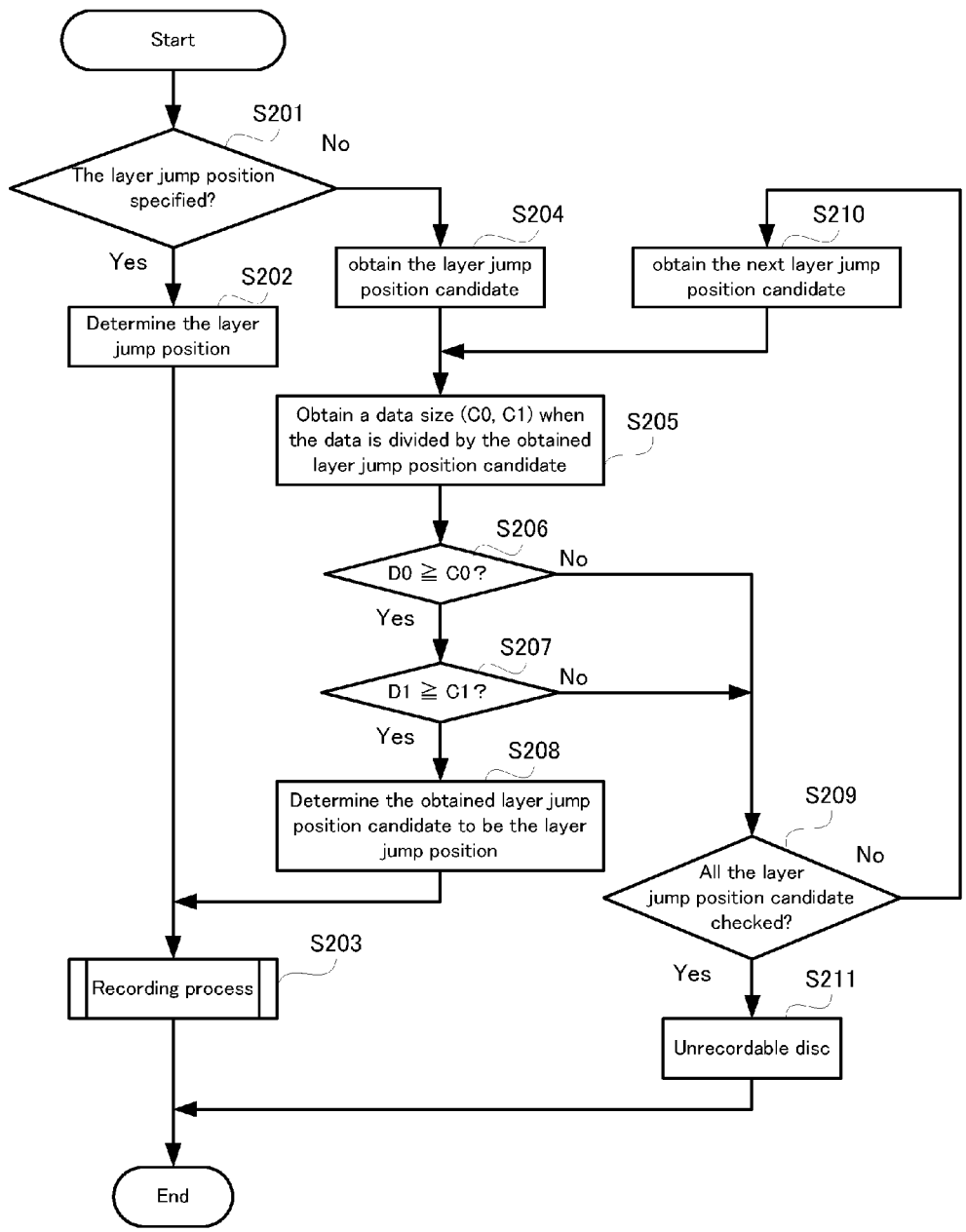
FIG. 7 is a flowchart showing a flow of operations in a layer jump position determination and recording process in a second operation example.

With reference to FIG. 7, an explanation will be given on an aspect of the obtainment of the layer jump position by a second operation example of the recording apparatus in the example. FIG. 7 is a flowchart conceptually showing a flow of the second operation example. In the second operation example, if the layer jump position in the content data is not obtained for such a reason as it is not added or transmitted (step S201: No), an operation for determining the layer jump position is performed on the recording apparatus.

If the layer jump position is normally obtained (step S201: Yes), the obtained position is determined to be the layer jump position (step S202), and the same recording process as shown in the first operation example is performed (step S203).

On the other hand, if the layer jump position is not obtained for some reasons, firstly, position information is obtained which is at least one layer jump position candidate in the content data to be recorded (step S204).

Here, the conditions of the layer jump position candidate are being a position that is a candidate for determining the layer jump position when the data is divided, a Cell boundary in the data, an ECC boundary, and a position at which the continuous reproduction of the data is not guaranteed in Seamless Playback Flag which indicates whether or not the continuous reproduction of the data is guaranteed. However, in the same recording process as the first operation example described later (step S203), even a position that is not the ECC boundary can be added to the layer jump position candidate by recording a sector unit of dummy data immediately after the file system and making an adjustment such that the end of the data in the L0 layer is the ECC boundary in the process of preparing the first padding data (the step S103).

Specifically, VMGI (Video Manager Information) and VTSI (Video Title Set Information) of the content data are extracted and analyzed under the control of the CPU 221. The position information which satisfies at least one of the aforementioned conditions of the layer jump position candidate is detected, and the position of one layer jump position candidate is obtained.

Then, when the content data is divided into two in the obtained one layer jump position candidate, it is judged whether or not such conditions are satisfied that a sum (C0) of a size from the content data start position to the layer jump position candidate and the size of the file system, which is information for controlling the reproduction of the content data, is less than or equal to the maximum capacity (D0) of the first data area 112 and that a size (C1) from the layer jump position candidate of the content data to the end position is less than or equal to the maximum capacity (D1) of the second data area 122 (step S206 and step S207). Specifically, each capacity and size are read under the control of the CPU 221 (step S205), and the judgment is performed on the basis of the read values.

Here, if all the sizes of the respective portions in the content data satisfy the conditions (the step S206: Yes, and the step S207: Yes), the obtained one layer jump position candidate is determined to be the layer jump position under the control of the CPU 221, and the position information is obtained (step S208). At this time, the data of the file system or the like described above is generated on the basis of the determined layer jump position.

Then, the same recording process as described in the first operation example is performed on the basis of the determined layer jump position (step S203).

On the other hand, if any one of the sizes of the respective portions in the content data does not satisfy the conditions (the step S206: No or the step S207: No, or both of them), the obtained layer jump position candidate cannot be the layer jump position. Here, in order to make an judgment based on the aforementioned conditions regarding another layer jump position candidate obtained, firstly, it is judged whether or not there is another position information detected that satisfies the conditions of the layer jump position candidate that has not been judged, i.e. it is judged whether or not the obtained layer jump position candidate is the last candidate that satisfies the conditions of the detected layer jump position candidate (step S209).

If it is judged that the obtained layer jump position candidate is not the last candidate that satisfies the conditions of the detected layer jump position candidate (the step S209: No), the position information satisfying the conditions of the next layer jump position candidate is obtained as the position of the layer jump position candidate (step S210). With reference to the obtained layer jump position candidate, it is judged whether or not the size of each of the portions when the content data is divided into two satisfies the condition defined for the maximum capacity of the data area to be recorded, in the aforementioned obtained one layer jump position candidate (the step S205 to the step S207).

If the obtained layer jump position candidate is the last candidate that satisfies the conditions of the detected layer jump position candidate (the step S209: Yes), then it is judged that the content data cannot be recorded onto the optical disc 100, and the recording process is ended (step S211).

By virtue of the second operation example, it is possible to obtain such a position, as the layer jump position, that satisfies the conditions of the layer jump position candidate that the continuous reproduction of the data is not guaranteed and that satisfies the condition that the size of each of the portions when the content data is divided into two does not exceed the maximum capacity of the data area to be recorded at the position of the layer jump position candidate, without using a more complicated method, such as image recognition, for the data, which is, for example, video data. As a result, efficient data recording can be performed in response to various content data.

The present invention is not limited to the aforementioned example, but various changes may be made, if desired, without departing from the essence or spirit of the invention which can be read from the claims and the entire specification. A recording apparatus, a recording method, and a computer program, all of which involve such changes, are also intended to be within the technical scope of the present invention.

The invention claimed is:

1. A recording apparatus comprising:
a recording device for recording content data onto a recording medium which has i) a first recording layer including a first data area in which the content data is recorded by applying a laser beam, and ii) a second recording layer including a second data area in which the content data is recorded by applying the laser beam through the first recording layer and on which an address of a position corresponding to a maximum capacity of the first data area is recorded in advance;
a first reading device for reading the address of the position corresponding to the maximum capacity of the first data area;
an obtaining device for obtaining a layer jump position in the content data;
a calculating device for calculating an address of a position to start the recording of the content data such that the layer jump position in the content data corresponds to the address of the position corresponding to the maximum capacity of the first data area; and
a first controlling device for controlling said recording device to record first padding data into an area from an address of a start position of the first data area to the address of the position to start the recording of the content data before the content data is recorded.

2. The recording apparatus according to claim 1, wherein,
an address of a position corresponding to a maximum capacity of the second data area is recorded in advance on the recording medium, and
said recording apparatus further comprises:
a second reading device for reading the address of the position corresponding to the maximum capacity of the second data area; and
a second controlling device for controlling said recording device to record second padding data into an area from an address of a position corresponding to a maximum capacity of the content data to be recorded in the second data area to the address of the position corresponding to the maximum capacity of the second data area.

3. The recording apparatus according to claim 1, wherein said obtaining device comprises:
a first determining device for determining at least one layer jump position candidate in which continuous reproduction is not guaranteed, in the content data; and
a second determining device for determining the layer jump position candidate (i) that a sum of a size from the start position of the content data to the layer jump position candidate and a size of a file system, which is information for controlling reproduction of the content data, is less than or equal to the maximum capacity of the first data area, and (ii) that a size from the layer jump position candidate to an end position of the content data is less than or equal to a maximum capacity of the second data area, to be the layer jump position.

4. The recording apparatus according to claim 2, wherein said recording device records management information, which is information for managing the content data to be recorded, at a position corresponding to the maximum capacity of the second data area on the recording medium.

5. The recording apparatus according to claim 2, wherein,
said first controlling device comprises a first computing device for computing a size of the first padding data from an address of the start position of the first data area and the address of the position to start the recording of the content data, and
said second controlling device comprises a second computing device for computing a size of the second padding data from an address of the position corresponding to the maximum capacity of the content data to be recorded and the address of the position corresponding to the maximum capacity of the second data area.

6. The recording apparatus according to claim 5, wherein said recording apparatus further comprises a preparing device for preparing the first padding data having the size computed by the first computing device under the control of said first controlling device and preparing the second padding data having the size computed by the second computing device under the control of said second controlling device.

7. A non-transitory computer readable recording medium recorded thereon a computer program executed by a computer provided in a recording apparatus to perform functions of:
a recording process of recording content data onto a recording medium which has a first recording layer including a first data area in which the content data is recorded by applying a laser beam and a second recording layer including a second data area in which the content data is recorded by applying the laser beam through the first recording layer and on which an address of a position corresponding to a maximum capacity of the first data area is recorded in advance;
a first reading process of reading the address of the position corresponding to the maximum capacity of the first data area;
an obtaining process of obtaining a layer jump position in the content data;
a calculating process of calculating an address of a position to start the recording of the content data such that the layer jump position in the content data corresponds to the address of the position corresponding to the maximum capacity of the first data area; and
a first controlling process of controlling said recording device to record first padding data into an area from an address of a start position of the first data area to the address of the position to start the recording of the content data before the content data is recorded.

8. A recording method comprising:
a recording process of recording content data onto a recording medium which has a first recording layer including a first data area in which the content data is recorded by applying a laser beam and a second recording layer including a second data area in which the content data is recorded by applying the laser beam through the first recording layer and on which an address of a position corresponding to a maximum capacity of the first data area is recorded in advance;
a first reading process of reading the address of the position corresponding to the maximum capacity of the first data area;

an obtaining process of obtaining a layer jump position in the content data;

a calculating process of calculating an address of a position to start the recording of the content data such that the layer jump position in the content data corresponds to the address of the position corresponding to the maximum capacity of the first data area; and a first controlling process of controlling said recording device to record first padding data into an area from an address of a start position of the first data area to the address of the position to start the recording of the content data before the content data is recorded.

* * * * *